United States Patent [19]

Takahashi

[11] 4,156,888

[45] May 29, 1979

[54] FLYBACK TRANSFORMER

[75] Inventor: Haruo Takahashi, Tokyo, Japan

[73] Assignee: Denki Onkyo Co., Ltd., Tokyo, Japan

[21] Appl. No.: 895,376

[22] Filed: Apr. 11, 1978

[30] Foreign Application Priority Data

Apr. 11, 1977 [JP] Japan ............................ 52-44977[U]

[51] Int. Cl.[2] ............................................... H02B 1/04

[52] U.S. Cl. .................................... 361/331; 363/144; 336/192

[58] Field of Search .................. 363/144, 146; 336/96, 336/192, 210, 185, 198; 361/331, 332, 334, 426, 427, 429

[56] References Cited

U.S. PATENT DOCUMENTS

| | | | |
|---|---|---|---|
| 2,876,425 | 3/1959 | Hampel | 336/198 |
| 2,985,812 | 5/1961 | Peterson | 361/331 |
| 3,516,040 | 6/1970 | Ripley | 336/96 |
| 3,979,707 | 9/1976 | Prince, Jr. | 336/192 |

*Primary Examiner*—Gerald P. Tolin
*Attorney, Agent, or Firm*—Armstrong, Nikaido, Marmelstein & Kubovcik

[57] ABSTRACT

Fastened about the legs of a pair of U-shaped cores are a low voltage coil bobbin having a low voltage coil and a high voltage coil bobbin having a high voltage coil. Attached to one side surface of the core is a metallic member for core support, and attached to the other side surface is a rectifier holder to which are secured high voltage rectifier circuit components, the metallic member and rectifier holder cooperating to embrace the core. The low voltage coil bobbin is secured to a terminal board having a plurality of terminal pins fixed thereto, thereby forming a unitary assembly, and the terminal board is further secured to the metallic member. The low voltage coil bobbin is secured to the rectifier holder, thereby forming a single, unitary assembly.

6 Claims, 10 Drawing Figures

FLYBACK TRANSFORMER

BACKGROUND OF THE INVENTION

This invention relates to a flyback transformer for high voltage generation for application in a television receiver and the like, and more particularly to a flyback transformer wherein a low voltage coil bobbin is secured to a rectifier holder which cooperates with a metallic member for core support to embrace a core, a terminal board is secured to the low voltage coil bobbin, the metallic member is secured to the terminal board, fixing members for encapsulation are provided on the rectifier holder, and the entire assembly is formed into a unitary body by encapsulation within an insulating molding material.

Recent reductions in the size and weight of television picture tubes have led to increased demand for high voltage generation flyback transformers which also have a compact, light-weight construction.

In order to obtain a compact construction for conventional flyback transformers of the type described, a rectifier holder for accommodating such rectifier circuit components as a rectifier, condensers, etc. was secured to a core on which high and low voltage coils were wound. This structure was then housed in a molding case made of an insulating synthetic resin and formed into a unitary body by encapsulation within a molding material, after which the molding case was covered by a shielding case. However, a flyback transformer having such a construction possesses a large number of component parts due to the utilization of the molded case and shielding case, and the assembly operation requires excessive labor. Moreover, still other advantages are encountered such as power losses due to stray capacitance caused by the shielding case.

SUMMARY OF THE INVENTION

It is therefore the object of the present invention to provide a flyback transformer having a compact, light-weight structure.

According to the features of the flyback transformer of the present invention, a low voltage coil bobbin having a low voltage coil and a high voltage coil bobbin having a high voltage coil are fastened about the legs of a pair of U-shaped cores. Attached to one side surface of the core is a metallic member for core support, and attached to the other side surface is a rectifier holder to which are secured high voltage rectifier circuit components, the metallic member and rectifier holder cooperating to embrace the core. The low voltage bobbin is secured to a terminal board having a plurality of terminal pins fixed thereto, thereby forming a unitary assembly, and the terminal board is further secured to the metallic member. The low voltage coil bobbin is secured to the rectifier holder, thereby forming a single, unitary assembly.

DETAILED DESCRIPTION OF THE INVENTION

Figure 1:
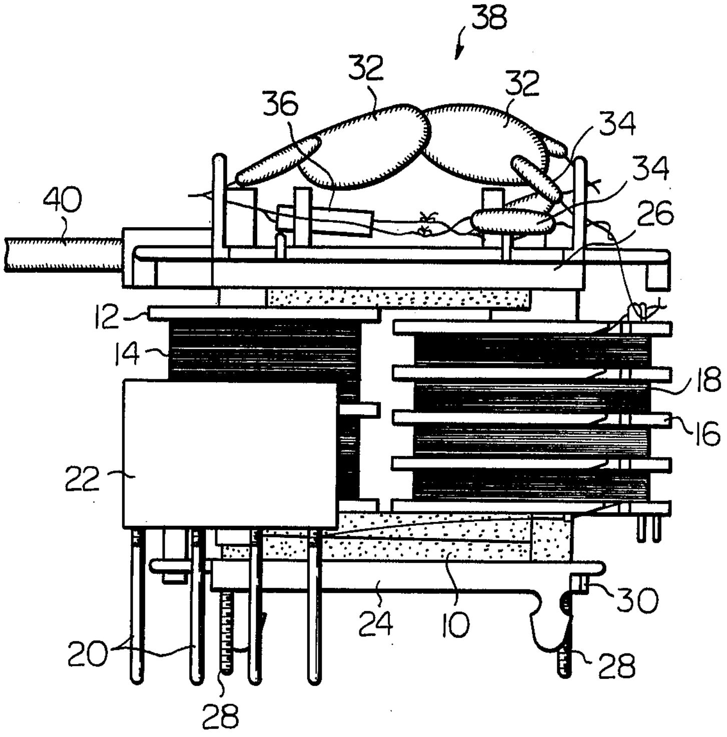
FIG. 1 is a side view of an embodiment of a flyback transformer, shown prior to encapsulation, in accordance with the present invention.

Referring to FIG. 1, a core 10 is composed of a pair of combined U-shaped members made of a strongly magnetic material such as ferrite, a low voltage coil 14 wound on low voltage coil bobbin 12 and a high voltage coil 18 wound on high voltage coil bobbin 16 being fitted about a pair of opposing legs of the core 10. Engaged with and secured to low voltage coil bobbin 12 is a terminal board 22 implanted with a plurality of terminal pins 20. The core 10 comprising the combined pair of U-shaped core members is embraced by metallic member 24 for core support and a rectifier holder 26, and is held between these members by fastening them together using screws 28 and nuts 30.

Figure 2:
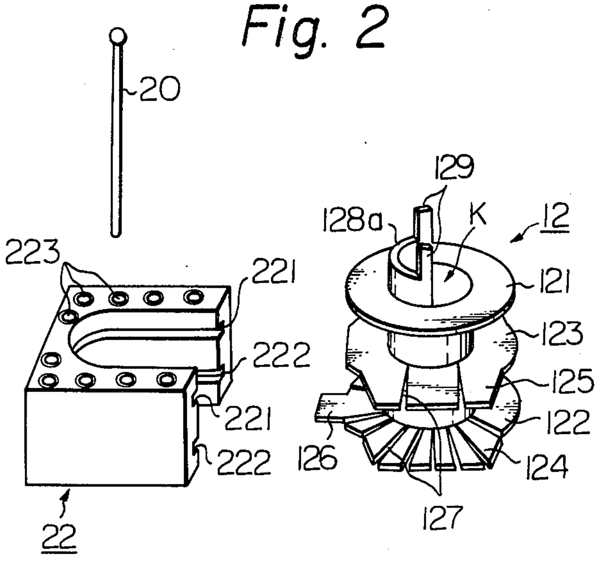
FIG. 2 is a perspective view of a terminal board and low voltage coil bobbin of the flyback transformer of FIG. 1, the terminal board and bobbin being shown prior to assembly.

The structure of low voltage coil bobbin 12 and terminal board 22 can be seen more clearly in FIG. 2. Low voltage coil bobbin 12 includes three flanges, namely flanges 121, 122 at either end and a flange 123 formed midway therebetween, the low voltage coil 14 being wound in the spaces between the flanges. Projecting in the diametric direction from the rim of flanges 122, 123 are engaging edges 124, 125, with one portion of engaging edge 124 being extended to form a projection 126. Engaging edges 124, 125 include slots 127 for the passage therethrough of lead wires which are led out from low voltage coil 14. In order to prevent the rotation of low voltage coil bobbin 12 once the legs of core 10 have been inserted into the hollow portion at the center of the bobbin, semi-cylindrical projections **128*a*, 128*b* which engage with the side surface of the core are formed on the outward sides of flanges 121, 122. The top edge of projection 128*a* on the side of flange 121 includes a pair of fitting projections 129 which are inserted into rectifier holder 26. Terminal board 22 that engages with low voltage coil bobbin 12 is substantially U-shaped and includes on its inner surface two engagement grooves 221, 222 corresponding to engaging edges 124, 125 of the low voltage coil bobbin, a portion of engagement groove 222 having a space for accommodating the projection 126 formed on engaging edge 124. Provided through the top surface of terminal board 22 extending in the direction of thickness are a plurality of round holes 223 into each of which a terminal pin 20** is inserted and fixed by the application of a bonding agent.

Setting pins for office use can advantageously be employed as the terminal pins.

Figure 3:
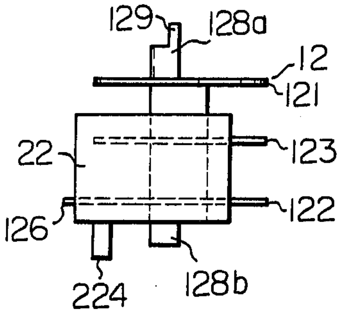
FIG. 3 is a side view of the low voltage coil bobbin and terminal board of FIG. 2 shown in the assembled state.

FIG. 3 shows low voltage coil bobbin 12 engaged with and secured to terminal board 22. Coil bobbin 12 and terminal board 22 are engaged and then secured to each other by means of heat fusion with engaging edges 124, 125 being fitted into engagement grooves 221, 222 and projection 126 of engaging edge 124 outwardly protruding from the space formed in engagement groove 222. Although low voltage coil 14 and terminal pins 20 are not shown in FIG. 3, the actual assembly is accomplished after low voltage coil 14 is wound on low voltage coil bobbin 12 and the pins 20 are implanted in the terminal board 22. The fully assembled transformer is as illustrated in FIG. 1. A projecting column 224 adapted to fit into metallic member 24 for core support is formed on terminal board 22 on the same side of the board from which the terminal pins 20 project.

Figure 4:
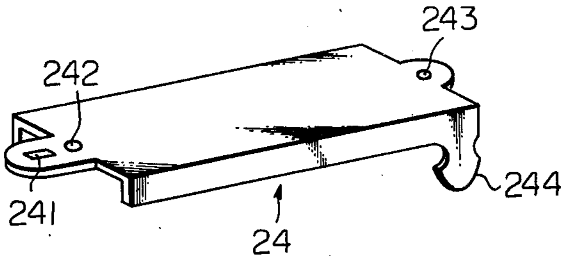
FIG. 4 is a perspective view of a metallic member for supporting the core of the flyback transformer illustrated in FIG. 1.

FIG. 4 illustrates metallic member 24 for core support attached to one side surface of core 10. Metallic member 24 includes a hole 241 for receiving the projecting column 224 formed on terminal board 22, a pair of holes 242, 243 for insertion of screws 28, and legs 244 on both side edges which are utilized when the flyback transformer is secured on a printed circuit board.

Figure 5:
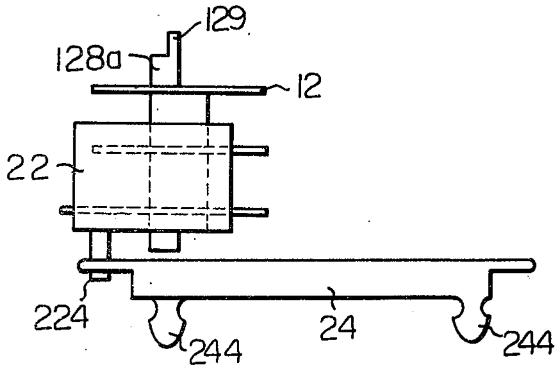
FIG. 5 is a side view of the low voltage coil bobbin and terminal board of FIG. 3 shown assembled and secured to the metallic member illustrated in FIG. 4.

FIG. 5 shows low voltage coil bobbin 12 and terminal board 22, illustrated in FIG. 3, as they appear when assembled and secured on metallic member 24 with the assistance of the projecting column 224 of the terminal board. In this case, the leg of core 10 is passed through the center of low voltage coil bobbin 12 in the actual assembly; however, core 10 is omitted from the drawing for the sake of simplicity.

Figure 6:
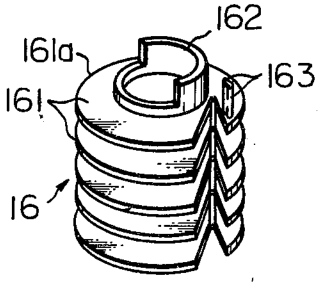
FIG. 6 is a perspective view of a high voltage coil bobbin illustrated in FIG. 1.

The high voltage coil bobbin 16 for winding the high voltage coil 18 can best be seen in FIG. 6. High voltage coil bobbin 16 has a number of flanges 161 between which a prescribed number of turns of high voltage coil 18 are wound. A semi-cylindrical projection 162 for preventing rotation of high voltage bobbin is formed on the side surface of flange 161*a* on the high voltage output side of the bobbin, and axially extending projecting pillars 163 for tying down the lead wires are provided on the outward sides of the flanges at either end of the bobbin.

Figure 7:
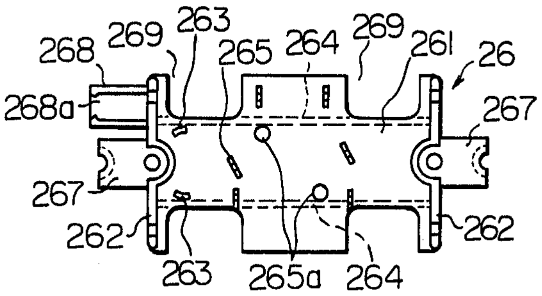
FIG. 7 is a top view of a rectifier holder of the flyback transformer of FIG. 1.
Figure 8:
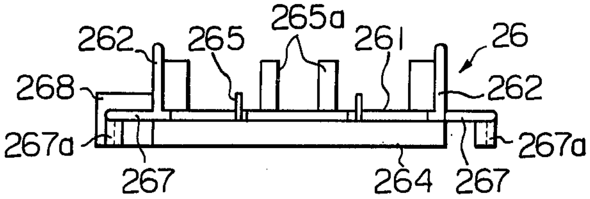
FIG. 8 is a side view of the rectifier holder illustrated in FIG. 7.

FIGS. 7 and 8 show the structure of rectifier holder 26. Rectifier holder 26 includes a flat plate portion 261 which abuts the core 10, and side surface portions 262 formed on the edges of flat plate portion 261 that further includes fitting holes 263 located for insertion of the pair of projections 129 provided on the top portion of the semi-cylindrical projection 128*a* of the low voltage coil bobbin 12. Wall members 264 disposed in parallel and abutting the side edges of core 10 are formed on the side of flat plate portion 261 that abuts the core 10, while a plurality of supporting columns 265 for supporting and securing high voltage rectifier circuit components are erected on the side of flat plate portion 261 facing away from the side abutting the core. As shown in FIG. 1, high voltage rectifier circuit components such as a high voltage condenser 32, high voltage rectifier 34 and resistor 36 are connected and secured in the supporting columns 265. Of the supporting columns 265, specified columns 265*a* are made taller than the other columns so that the high voltage condenser 32 is restrictively disposed at a position above the tips of the supporting columns 265*a*, while the other components such as the rectifier 34 and resistor 36 are disposed below the tips of columns 265*a*, whereby the high voltage condenser 32 can be prevented from contacting rectifier 34 and resistor 36. Holes for insertion of screws 28 are provided in flat plate portion 261 of rectifier holder 26 and are shielded from the high voltage rectifier circuit components by the side surface portions 262. On the outward sides of side surface portions 262 of holder 26 a portion of flat plate member 261 is extended to form a pair of fixing members 267 for use during encapsulation. In order to facilitate the holding and fixing operations with respect to the mold for encapsulation, the fixing members 267 have a semi-cylindrical auxiliary finger 267*a* extending from each end on the side of the core. Further, one side surface portion 262 of rectifier holder 26 includes a compartment for accommodating a high voltage lead wire (indicated by reference numeral 40 in FIG. 1) which supplies the anode of a CRT with a high output voltage as rectified by the high voltage rectifier circuit components 38. When a high voltage lead wire 40 is accommodated, the end portion of compartment 268 on its inward side is provided with wedgeshaped projections 268*a* to embrace the covering of the wire. The flat plate portion 261 is also provided with cutouts 269 to facilitate the flow of an insulating molding material to be described later.

Figure 9:
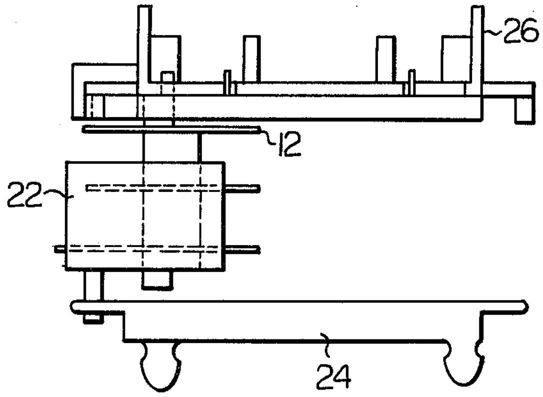
FIG. 9 is a side view of the metallic member, terminal board and low voltage coil bobbin of FIG. 5 shown assembled and secured to the rectifier holder.

FIG. 9 shows low voltage coil bobbin 12, terminal board 22 and metallic fixture 24 of FIG. 5 assembled and secured to rectifier holder 26 by means of the fitting projections 129 provided on low voltage coil bobbin 12. Although the leg of core 10 equipped with the high voltage coil bobbin 16 actually passes through the center of the bobbin as in the case of the low voltage coil bobbin 12, the core 10, and high voltage coil bobbin 16 are omitted from the drawing for the sake of simplicity. In the actual assembly operation a low voltage coil 14 is wound on one leg of core 10 via low voltage coil bobbin 12 and high voltage coil 18 is wound on the other leg of the core via high voltage coil bobbin 16, the terminal pins 20 are implanted and fixed in terminal board 22, the high voltage rectifier circuit components 38 are connected and secured in rectifier holder 26, and, with the high voltage lead 40 in the connected state, core 10 is embraced between metallic member 24 and rectifier holder 26 and securely held by these members by making use of screws 28 and nuts 30. The final assembly is as depicted in FIG. 1.

Figure 10:
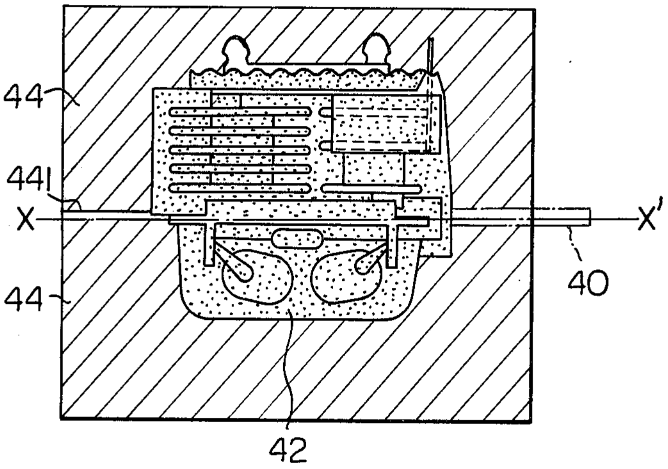
FIG. 10 is a side view of the flyback transformer of FIG. 1 shown encapsulated through the use of a mold, assuming the molding material is transparent.

FIG. 10 illustrates the fully assembled flyback transformer of FIG. 1 as it appears when molded into a unitary body by means of an insulating molding material 42. In this case, the fixing members 267 for encapsulation provided on rectifier holder 26 are secured through a fixing portion on the parting face X–X′ of the encapsulation mold 44 such that the tips of the terminal pins 20 are upwardly directed. The entire assembly with the exception of the legs 244 of the metallic member 24 and the terminal pins 20 is then integrated by encapsulation in the insulating molding material 42. The molding material is injected through an injection port 441 formed in a portion of the parting face X–X′ of the mold. In order to encapsulate and unify the core 10 as well, the molding material should be comparatively resilient after hardening. Silicon rubber is a suitable material.

It should be understood that the present embodiment places no structural restriction upon the engaging relationships between the low voltage coil bobbin and terminal board, between the terminal board and metallic member, and between the low voltage coil bobbin and rectifier holder. It is also obvious that the configuration, position, etc., of the fixing portions for encapsulation provided on the rectifier holder can be modified freely without departing from the spirit or scope of the present invention.

What is claimed is:

1. A flyback transformer comprising:

a pair of U-shaped cores;

a low voltage coil bobbin having a low voltage coil and a high voltage coil bobbin having a high voltage coil, each bobbin being fastened about a corresponding leg of the core;

a terminal board having a plurality of terminal pins secured thereto;

a metallic member for core support attached to one side surface of said core; and a rectifier holder attached to the other side surface of said core and cooperating with said metallic member to embrace said core, and having secured thereto high voltage rectifier circuit components; wherein said low voltage coil bobbin is secured to said terminal board; said terminal board is secured to said metallic member; and said low voltage coil bobbin is secured to said rectifier holder, thereby forming a unitary assembly.

2. The flyback transformer according to claim 1, wherein encapsulation fixing members for position adjustment are formed on the rectifier holder.

3. The flyback transformer according to claim 1, wherein the core, low voltage coil, high voltage coil, terminal board, a portion of the terminal pins, a portion of the metallic member, the rectifier holder and the high voltage rectifier circuit components are enclosed by an insulating molding material.

4. The flyback transformer according to claim 1, wherein the low voltage coil bobbin is provided with flanges, the terminal board is provided with grooves corresponding to the flanges of the low voltage coil bobbin, and the flanges of the low voltage coil bobbin are fitted into the grooves of the terminal board and fixed thereto by heat fusion to form a unitary body.

5. The flyback transformer according to claim 1, wherein the rectifier holder is composed of a flat plate portion and side surface portions, supporting columns for the high voltage rectifier circuit components are erected on the flat plate portion, and a pair of encapsulation fixing members are formed on the side surface portions and a high voltage lead wire compartment is formed on one side surface.

6. The flyback transformer according to claim 1, wherein silicon rubber is employed as the molding material.

* * * * *